United States Patent
Ito

(10) Patent No.: US 9,235,522 B2
(45) Date of Patent: Jan. 12, 2016

(54) DATA SUPPLY DEVICE, CACHE DEVICE, DATA SUPPLY METHOD, AND CACHE METHOD

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 13/467,774

(22) Filed: May 9, 2012

(65) Prior Publication Data

US 2012/0297143 A1 Nov. 22, 2012

(30) Foreign Application Priority Data

May 18, 2011 (JP) .................. 2011-111585

(51) Int. Cl.
G06F 13/00 (2006.01)
G06F 12/08 (2006.01)
G06F 12/12 (2006.01)

(52) U.S. Cl.
CPC .......... *G06F 12/0862* (2013.01); *G06F 12/126* (2013.01); *G06F 12/0859* (2013.01); *G06F 2212/6022* (2013.01)

(58) Field of Classification Search
CPC G06F 12/121; G06F 12/0831; G06F 12/0862
USPC ......................................................... 711/133
See application file for complete search history.

(56) References Cited

U.S. PATENT DOCUMENTS

| | | | |
|---|---|---|---|
| 5,293,609 A * | 3/1994 | Shih et al. ...................... | 711/137 |
| 5,623,608 A * | 4/1997 | Ng ................................ | 711/137 |
| 5,724,613 A * | 3/1998 | Wszolek ......................... | 710/33 |
| 5,983,324 A | 11/1999 | Ukai et al. | |
| 6,157,987 A | 12/2000 | Krishnamurthy et al. | |
| 6,658,534 B1 | 12/2003 | White et al. | |
| 6,754,772 B2 | 6/2004 | Crook et al. | |
| 7,657,783 B2 | 2/2010 | Levitan | |
| 2001/0027510 A1 * | 10/2001 | Sasahara ....................... | 711/133 |
| 2003/0018853 A1 * | 1/2003 | Tokar et al. ................... | 711/118 |
| 2003/0093623 A1 * | 5/2003 | Crook et al. .................. | 711/133 |
| 2003/0105926 A1 | 6/2003 | Rodriguez | |
| 2007/0067576 A1 * | 3/2007 | Thekkath et al. ............. | 711/137 |
| 2008/0235531 A1 * | 9/2008 | Levitan ........................... | 714/2 |
| 2010/0077154 A1 | 3/2010 | Chou | |

FOREIGN PATENT DOCUMENTS

| | | |
|---|---|---|
| CN | 1217799 A | 5/1999 |
| EP | 1217526 A1 * | 6/2002 |
| EP | 1 622 026 A2 | 2/2006 |
| JP | 2005-322215 A | 11/2005 |
| JP | 2006-185442 A | 7/2006 |
| JP | 3846638 B2 | 11/2006 |

* cited by examiner

*Primary Examiner* — Aimee Li
*Assistant Examiner* — Trang Ta
(74) *Attorney, Agent, or Firm* — Canon U.S.A., Inc. IP Division

(57) ABSTRACT

A data supply device includes an output unit, a fetch unit including a storage region for storing data and configured to supply data stored in the storage region to the output unit, and a prefetch unit configured to request, from an external device, data to be transmitted to the output unit. The fetch unit is configured to store data received from the external device in a reception region, which is a portion of the storage region and, according to a request from the prefetch unit, to assign, as a transmission region, the reception region where data corresponding to the request is stored. The output unit is configured to output data stored in the region assigned as the transmission region by the fetch unit.

21 Claims, 15 Drawing Sheets

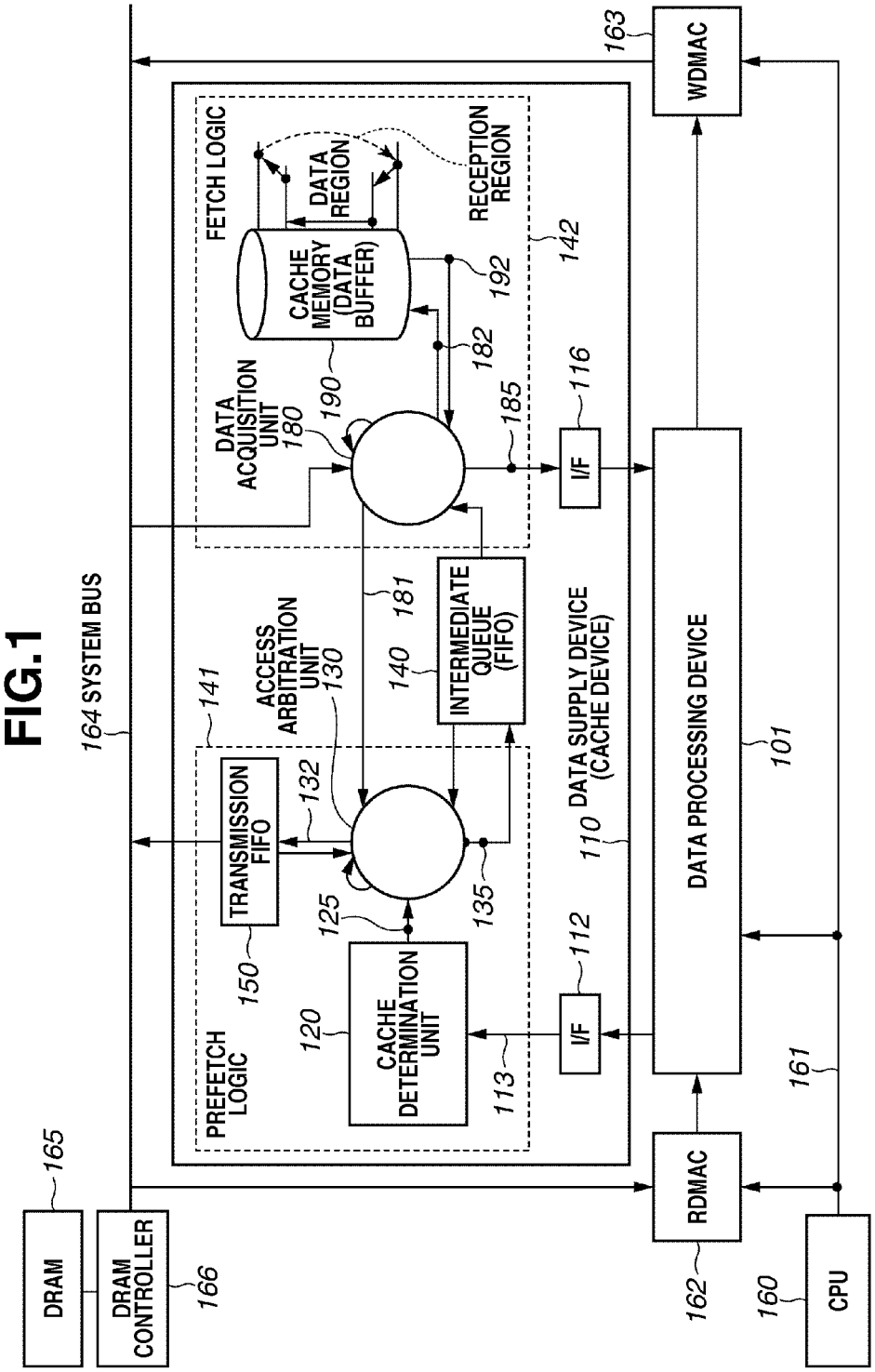

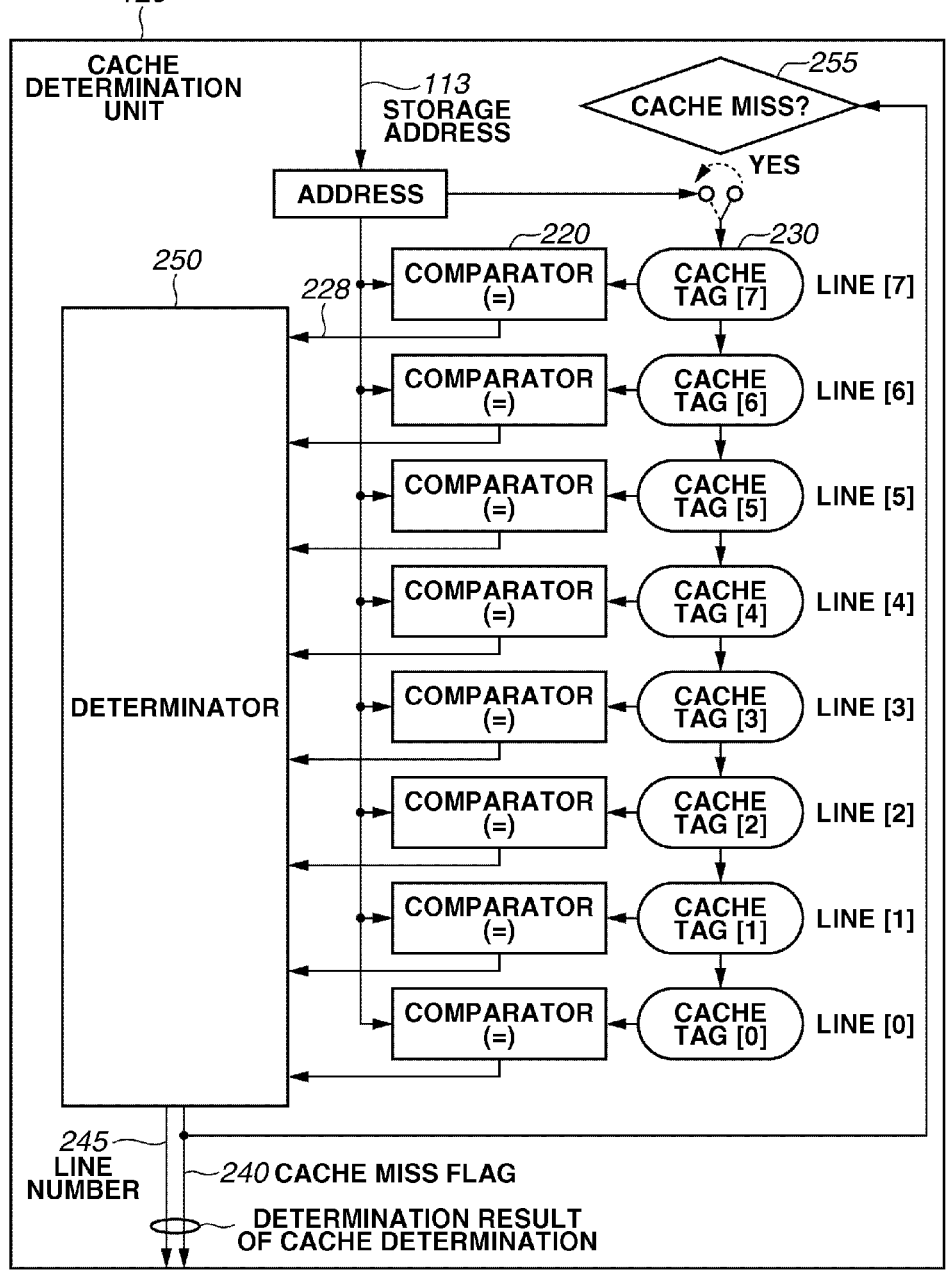

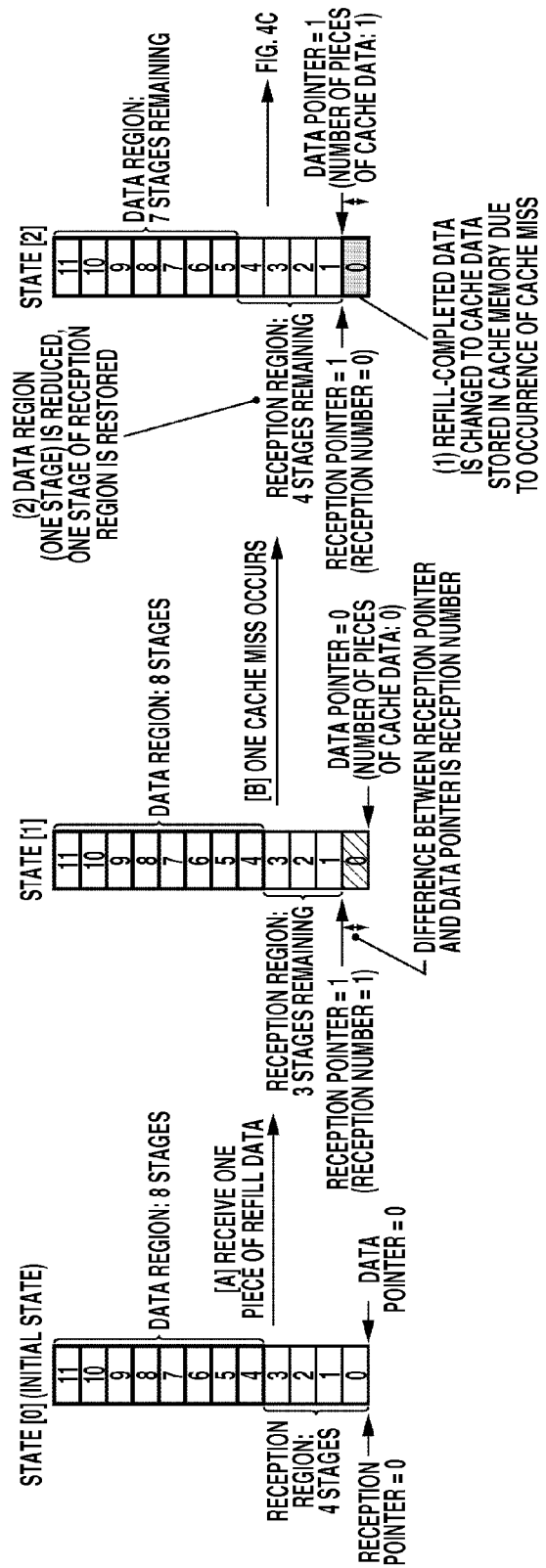

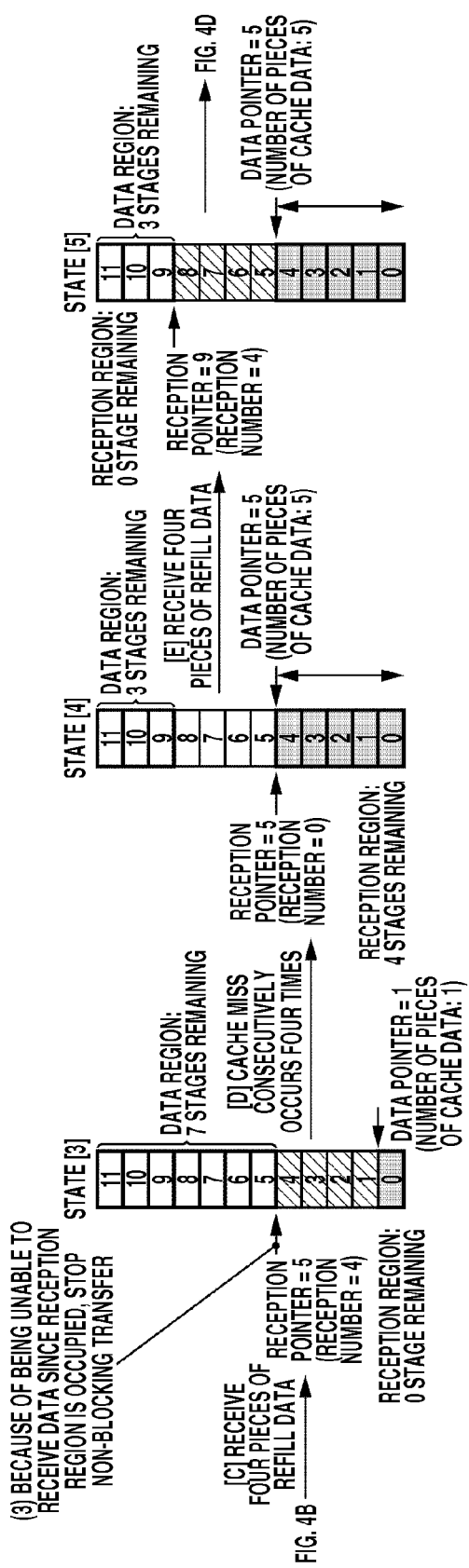

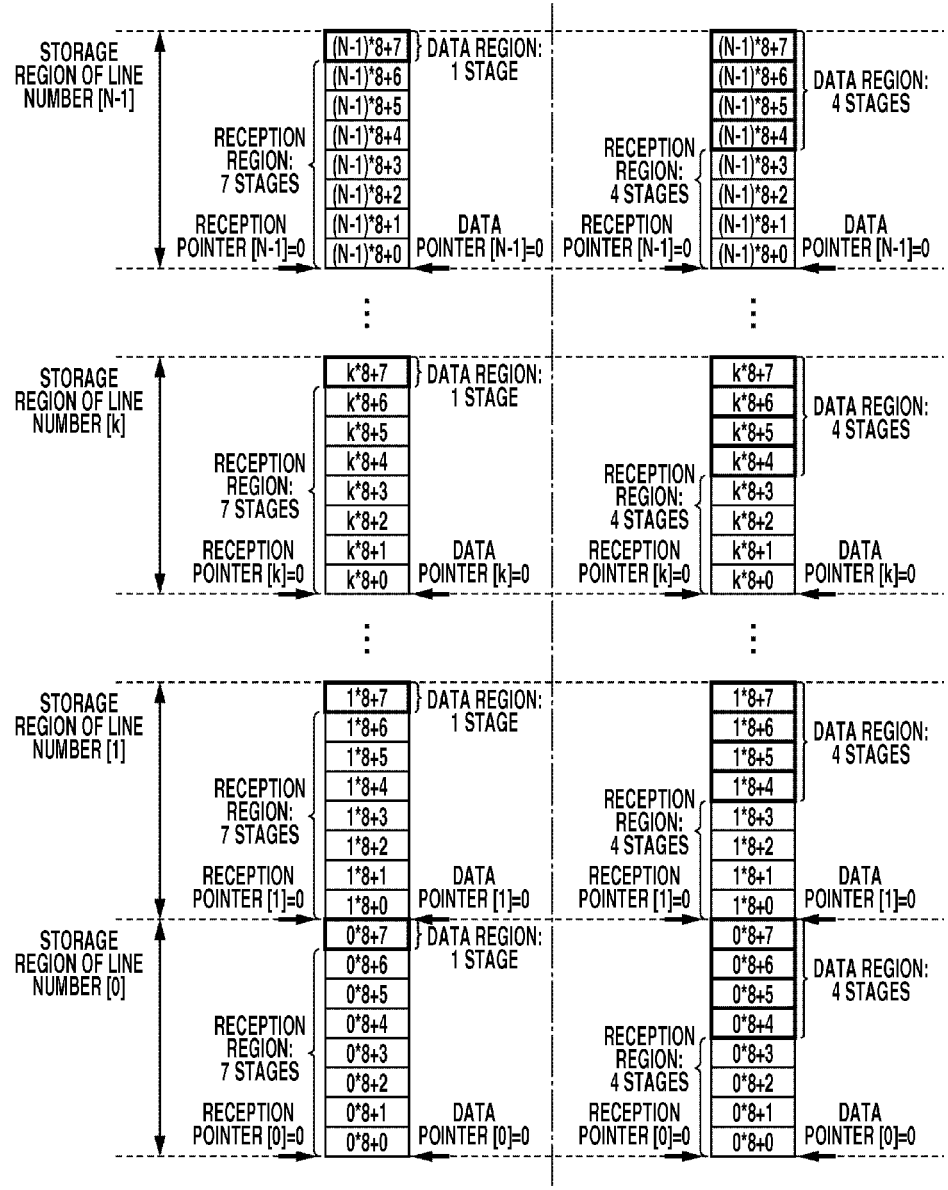

DATA SUPPLY DEVICE, CACHE DEVICE, DATA SUPPLY METHOD, AND CACHE METHOD

BACKGROUND OF THE INVENTION

1. Field of the Invention

The present invention relates to a data supply technique useful for efficiently supplying data in a computer system.

2. Description of the Related Art

In recent years, improved processing performance and cost reduction have been required for various apparatuses. Generally, a computer system includes a processor which executes an application, a data processing circuit, and a storage device, such as a memory, used for storing a program or data to be processed. It is ideal that a storage device in a computer system is capable of reading/writing all the programs and data used by the processor and the data processing circuit at a high speed. For example, if a memory unit with comparatively short access latency, such as a static dynamic random access memory (SRAM), is provided as a dedicated local memory for each processor and data processing circuit, the processing performance can be easily improved.

On the other hand, in realizing a cost reduction of apparatuses, it is desirable that a single storage device can be shared by many processors and data processing circuits so that the number of storage devices can be reduced. Further, when a memory is used as a storage device, in most cases, an inexpensive dynamic random access memory (DRAM) widely used at that time is used as the memory.

However, if an inexpensive DRAM is used, access latency will be increased compared to the SRAM described above. Further, if a single storage device is shared among many processors and data processing circuits, competing of reading/writing of the storage device among the processors and data processing circuits occurs. In such a case, arbitration of each access is performed and, as a result, the access latency of the processors or data processing circuits will be increased. Thus, processing performance of each processor or data processing circuit is reduced.

In order to prevent a performance reduction of the above-described processor or data processing circuit, a cache device is generally provided between the processor or the data processing circuit and the storage device. So long as the desired data can be read out from an implemented cache device, each processor or data processing circuit does not access the storage device (submit a data request). In this manner, access to the storage device from each processor or data processing circuit is reduced and the total access bandwidth can be reduced.

Although the circuit size naturally increases according to the use of a data supply mechanism such as the cache device, the circuit size is still small compared to when a dedicated local memory is used as described above. By using an optimum cache device in the computer system, a low cost apparatus with a high processing performance can be realized.

If the desired data exists in the cache device (a cache hit), the processor or the data processing circuit does not need to access the storage device for data, and thus the access latency is reduced. On the other hand, if the desired data does not exist in the cache device (a cache miss), naturally, the processor or the data processing circuit accesses the storage device (submits a data request) for the desired data. In this case, the access latency is similar to a case where a cache device is not provided.

Generally, the processor or the data processing circuit processes data in order. Thus, when a cache miss occurs, the processor or the data processing circuit temporarily stops operating for a while until the desired data is read out from the storage device. Naturally, the processing performance of the processor or the data processing circuit is reduced by such stopping of operation. This is called a blocking operation. Further, the process of reading out data from the storage device when a cache miss occurs is called "refill" and the data which is read out is called "refill data". Further, a unit of data read at a time is called a "refill length" and the length of the reading time is called "refill latency".

In order to enhance the processing performance, Japanese Patent No. 3846638 discusses a data supply device with a cache mechanism which can hide the above-described refill latency. First, a pipeline processor discussed in Japanese Patent No. 3846638 determines whether a cache miss is included in a preceding stage (pre-processing) of a predetermined pipeline stage with respect to data necessary in the processing in the pipeline stage. If a cache miss is determined, the data necessary in the preceding stage (pre-processing) is requested and the refill is executed.

At that time, the pipeline processor discussed in Japanese Patent No. 3846638 includes an intermediate queue (FIFO) that is longer than the refill latency. The pipeline processor discussed in Japanese Patent No. 3846638 sequentially stores the subsequent processing, including the processing being "refilled", in the intermediate queue (FIFO). In other words, the pipeline processor discussed in Japanese Patent No. 3846638 can continue the cache miss/hit determination of the next processing while storing the processing in the intermediate queue (FIFO). Thus, unlike the above-described blocking operation, the processing of the processor is not temporarily stopped each time a cache miss occurs.

On the other hand, the pipeline processor discussed in Japanese Patent No. 3846638, after reading out data from the storage device, which is necessary each time a cache miss occurs, needs to temporarily store the refill data in a fill FIFO before updating the cache memory. Since data of a cache hit, which precedes the data processing of the cache miss, exists in the intermediate queue (FIFO), if the data processing of the cache hit is not finished in a predetermined pipeline stage, the cache memory cannot be updated. Thus, the pipeline processor discussed in Japanese Patent No. 3846638 necessarily includes the above-described fill FIFO. An operation used for making a cache miss/hit determination of the next data processing by using an intermediate queue (FIFO) is called a non-blocking operation.

A data processing command is delayed in the intermediate queue (FIFO). If the refill is completed during the delay and the refill data for the cache miss is stored in the fill FIFO, the refill data can be supplied from the fill FIFO and the data processing can be executed. In other words, the data supply device having the cache mechanism discussed in Japanese Patent No. 3846638 can continue data processing while hiding the refill latency during the cache miss without temporarily stopping the processing.

However, according to the technique discussed in Japanese Patent No. 3846638, a fill FIFO for temporarily storing the refill data is required in addition to a cache memory.

A low-cost DRAM is used as the storage device of cache data. Generally, from the viewpoint of memory band efficiency, it is better if a data request is submitted in such a manner that reading/writing of the DRAM is collectively performed for certain consecutive storage regions. This data request is called burst access. Thus, it is desirable that the DRAM is accessed and read/written in this unit of burst access.

Due to advancements in fine semiconductor processing and product needs in manufacturing DRAMs, the internal operating frequency of DRAMs is increasing year by year together with the manufacture generation. Naturally, the unit of reading/writing by burst access is increasing year by year. Due to a growing demand for high performance devices, it is assumed that the reading/writing unit of DRAMs will continue to increase.

Regarding a cache device, cache data (cache line) corresponding to one cache tag (cache address) is often adjusted to an integral multiple of this reading/writing unit of burst access. The reading/writing unit of refill data (refill length) that corresponds to one cache miss will be the same as the cache line. For example, the reading/writing unit of refill data in relation to the above-described DRAMs is 32 to 128 bytes.

The above-described fill FIFO needs to have a capacity that can store an amount of refill data that corresponds to a number of commands of the cache miss in the intermediate queue (FIFO). The refill latency of a device that implements a cache device is tens to hundreds of cycles and the number of stages of the intermediate queue (FIFO) corresponds to such a number of cycles.

For example, if the cache hit ratio is 75%, 25% of the intermediate queue (FIFO) will be a cache miss. If the intermediate queue (FIFO) includes 128 stages, the fill FIFO will be 25% of 128 stages. Accordingly, 32 stages will be necessary for the fill FIFO. Considering the reading unit of refill data described above, the capacity of the fill FIFO is 1K to 4K bytes. This is not small enough to be ignored in a device that implements a cache device.

The cache device discussed in Japanese Patent No. 3846638 includes the following storage regions:

(1) a storage region of a cache tag used for determining a cache hit/miss by prefetch logic;
(2) a storage region of the intermediate queue (FIFO);
(3) a storage region of a fetch logic fill FIFO; and
(4) a storage region of a cache memory for storing fetch logic cache data.

As described above, the storage regions that impact the circuit size are (3) "fill FIFO" with a long refill length and (4) "cache memory". If (3) "fill FIFO" and (4) "cache memory" exist as different hardware devices as is discussed in Japanese Patent No. 3846638, the circuit size will be increased. Although the number of FIFO stages in (2) "intermediate queue (FIFO)" is large, since the intermediate queue is used for transferring a flag indicating a result of a cache hit/miss and an address where the data is stored in the cache memory, the data length of the FIFO itself is very short compared to the refill length described below with respect to the present subject matter.

SUMMARY OF THE INVENTION

The present invention is directed to reducing the circuit size of a data supply device while maintaining the processing performance thereof.

According to an aspect of the present invention, a data supply device includes an output unit, a fetch unit including a storage region for storing data and configured to supply data stored in the storage region to the output unit, and a prefetch unit configured to request, from an external device, data to be transmitted to the output unit, wherein the fetch unit is configured to store data received from the external device in a reception region, which is a portion of the storage region, and, according to a request from the prefetch unit, to assign, as a transmission region, the reception region where data corresponding to the request is stored, and wherein the output unit is configured to output data stored in the region assigned as the transmission region by the fetch unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating an example of a processing apparatus.

FIG. 2 is a block diagram illustrating an example of a cache determination unit.

FIGS. 4B, 4C, and 4D illustrate an example of an operation of the cache memory.

FIG. 7A is a block diagram illustrating an example of a direct mapped cache memory.

FIG. 7B is a block diagram illustrating an example of a 4-way set associative cache memory.

DESCRIPTION OF THE EMBODIMENTS

Figure 3A:
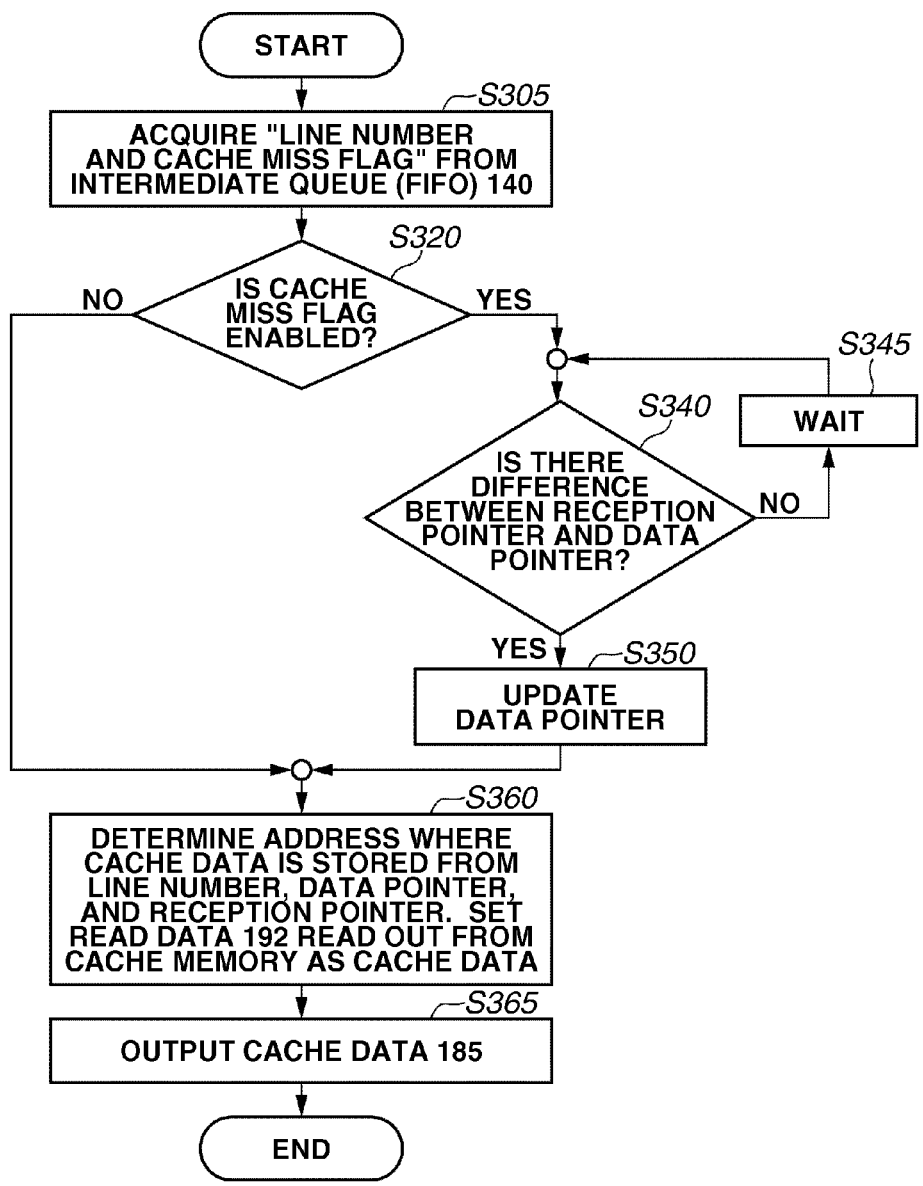
FIG. 3A is a flowchart illustrating an example of processing performed by a data acquisition unit.

Various exemplary embodiments, features, and aspects of the invention will be described in detail below with reference to the drawings.

Next, a processing apparatus including a cache device as a data supply device and the cache device according to an exemplary embodiment of the present invention will be described in detail.

FIG. 1 is a block diagram illustrating an example of an overall configuration of the processing apparatus. The processing apparatus includes a central processing unit (CPU) 160, a DRAM 165 as an external storage device (external memory), a DRAM controller 166, and a system bus 164. Further, for reading/writing of data of the DRAM 165, the processing apparatus also includes a direct memory access controller (DMAC) for reading data (RDMAC) 162, and a WDMAC 163 for writing data.

The processing apparatus further includes a data processing device 101, which performs data processing, such as image processing, and a data supply device (cache device) 110 according to an exemplary embodiment of the present invention. An arbitrary number of processing devices can be included in the data processing device. Each processing device can include a pipeline circuit for high-speed stationary processing but can also include a processor and a program which enable low-speed but flexible processing.

The CPU 160 controls the RDMAC 162, the WDMAC 163, and the data processing device 101 via a control bus 161 and performs overall control of the whole processing apparatus. According to an instruction from the CPU 160, the RDMAC 162 reads out data, such as an image or a program, stored in the DRAM 165 via the system bus 164 and the DRAM controller 166. Then, the RDMAC 162 inputs the acquired data in the data processing device 101.

The data processing device 101 processes the data and transfers the processed data such as a processed image to the WDMAC 163. The WDMAC 163 is given an instruction from the CPU 160 in advance, and on receiving the data from the data processing device 101, the WDMAC 163 stores the data in the DRAM 165 via the system bus 164 and the DRAM controller 166. The processing apparatus performs data processing such as image processing by executing the above-described operations.

During the above-described data processing, the data processing device 101 reads out data (image, video, setting value, table, attribute information, etc.) from the DRAM 165 via the cache device 110 (interfaces 112 and 116, FIFO 140, prefetch logic 141, fetch logic 142) and uses the data for the data processing. Further, if the data processing device 101 includes a processor and a program, the data processing device 101 can sequentially read out a program via the cache device 110 and execute data processing.

Next, the operation of the data supply device (cache device) 110 will be described in detail. When the data processing device 101 reads out data from the DRAM 165 via the data supply device (cache device) 110, the data processing device 101 inputs a storage address 113 of the data in the DRAM 165 into a cache determination unit 120 via an interface (I/F) 112. Based on the input storage address 113, the cache determination unit 120 determines a cache hit or a cache miss.

Next, an example of a circuit configuration of the cache determination unit 120 in the processing apparatus illustrated in FIG. 1 will be described in detail with reference to FIG. 2. In the following description, a cache device whose content-addressable (line selection) memory type is fully associative cache will be described.

First, the above-described storage address 113 is input into the cache determination unit 120. The cache determination unit 120 includes eight cache tags 230. Thus, the cache determination unit 120 is an 8-node fully associative cache device. Further, numbers ([0] to [7]) are assigned in advance to the eight cache tags 230. Each of the numbers indicates a "relative" cache line number of a corresponding cache memory. The reason why the numbers are "relative" is described below. Whether the storage address 113 which has been input and the eight cache tags 230 "match" is determined by eight comparators 220. Then, eight comparison results 228 are output from the comparators 220 to a determinator 250.

If the eight comparison results 228 include at least one "match", it is determined as a cache hit. If none of the eight comparison results 228 matches the storage address 113, it is determined as a cache miss. The determination result is output from the cache determination unit 120 as a cache miss flag 240.

If the evaluation result is a cache hit, the "relative" line number of the cache tag that "matched" is output from the cache determination unit 120 as a line number 245.

Further, if the determination result is a cache miss (YES in determination 255 in FIG. 2), the storage address 113 which has been input is written in the cache tag 230, and the cache tags are updated. The cache tag 230 is a storage region configured by a shift register. If the determination result is a cache miss, the value of the cache tag is shifted to the downstream cache tag according to the shift operation. In other words, the value of the cache tag [1] is written in the cache tag [0] and the value of the cache tag [2] is written in the cache tag [1].

Then, the writing is repeated and the value of the cache tag [7] is written in the cache tag [6]. Lastly, the value of the storage address 113 is written in the cache tag [7]. If the determination result is a cache miss, updating of the cache tags is performed as described above and the value of the line [7] is output from the cache determination unit 120 as the value of the line number 245.

The above-described principle for replacing a cache tag by shifting out the oldest tag information of the cache tag [0] is called "FIFO principle (round robin)". Since a fully associative cache device can be easily realized, the "FIFO principle (round robin)" is generally employed as the replacement method.

Lastly, the cache determination unit 120 combines the cache miss flag 240 and the line number 245 obtained as described above together with the storage address 113 which has been input and outputs them as a cache determination result 125.

According to the processing apparatus illustrated in FIG. 1, a non-blocking cache mechanism is employed to hide the refill latency, which occurs when a cache miss is encountered. According to this cache mechanism, even if the cache determination result 125 is a cache miss, information which may be used later is placed in an intermediate queue (FIFO) 140. Such information may be, for example, "line number and cache miss flag" 135. Then, the data processing device 101 reads out the cache data of the cache miss from the DRAM 165. Before the data is stored in a cache memory 190, the cache determination processing of the next data is executed.

According to such processing, while refilling of the cache data of a cache miss to the cache memory 190 from the DRAM 165 is performed, the cache determination processing for the subsequent data can be performed. Thus, a performance reduction due to a cache miss can be reduced.

Further, as described below, an access arbitration unit 130 extracts a storage address 132 that corresponds to the storage address 113 from the cache determination result 125 when a cache miss occurs, and sequentially stores the storage address 132 in a transmission FIFO 150. The DRAM controller 166 receives the storage address 132 in the transmission FIFO 150 and reads out the desired data (refill data) from the DRAM 165. Then the data is written in the cache memory 190.

A data acquisition unit 180 extracts a "cache miss flag" from the intermediate queue (FIFO) 140 and determines whether the cache determination has been a cache miss or a cache hit. If the result of the cache determination has been a cache hit, the data acquisition unit 180 directly reads out cache data 185 from the cache memory 190 and transfers the data to an I/F 116. On the other hand, if the result of the cache determination has been a cache miss, as described below with reference to the "data acquisition unit", desired cache data is updated. Then, the updated data (cache data 185) is transferred to the I/F 116.

The processing of reading out cache data of a cache miss from the DRAM 165 and updating the cache memory 190 corresponds to the processing procedures of the above-described refill processing.

The access arbitration unit 130 operates when the input cache determination result 125 is effective and waits if it is not effective. Further, the access arbitration unit 130 performs the processing below according to whether the "cache miss flag" is enabled/disabled as a result of the cache determination.

As a result of the cache determination, if the "cache miss flag" is enabled (cache miss), the access arbitration unit 130 determines whether a space is available in two FIFOs connected to the access arbitration unit 130. In other words, the access arbitration unit 130 determines whether a space is available in the storage region of each of the transmission FIFO 150 and the intermediate queue (FIFO) 140. Further, the access arbitration unit 130 determines the state of a prefetch enabling signal 181 sent from the data acquisition unit 180. If a space is available in each of the two FIFOs and the state of the prefetch enabling signal 181 is "enabled", the access arbitration unit 130 writes the "line number and cache miss flag" 135 in the intermediate queue (FIFO) 140. Simultaneously, the access arbitration unit 130 writes the storage address 132 in the transmission FIFO 150. If a space is not available in the two FIFOs or the state of the prefetch enabling signal 181 is "disabled", the access arbitration unit 130 stops (stalls) the cache determination unit 120 and waits until the space in the storage region of each of the two FIFOs becomes available and the prefetch enabling signal 181 becomes "enabled".

As a result of the cache determination, if the "cache miss flag" is disabled (cache hit), the access arbitration unit 130 determines whether a space is available in the intermediate queue (FIFO) 140. If a space is available, the access arbitration unit 130 writes the "line number and cache miss flag" 135 in the intermediate queue (FIFO) 140. If a space is not available, the access arbitration unit 130 stops (stalls) the cache determination unit 120 and waits until a space becomes available in the storage region. According to the configuration in FIG. 1, the "cache miss flag" is a 1-bit signal and the "line number" is a 3-bit signal. Thus, the data length of the "line number and cache miss flag" in the intermediate queue (FIFO) 140 is 4 bits. Accordingly, even if the intermediate queue (FIFO) 140 includes 128 stages, 64 bytes, which is not large, will satisfy the capacity. Thus, it is easy to increase the number of nodes of a fully associative cache tag and the number of stages of an intermediate queue (FIFO). Accordingly, the intermediate queue (FIFO) 140 does not constrain the configuration.

Further, the configuration of the above-described "cache determination unit" and "access arbitration unit" are based on a prefetch configuration (apparatus/circuit/logic) corresponding to the "data acquisition unit" described below. Further, the "cache determination unit" and the "access arbitration unit" are connected to a preceding pipeline stage with respect to a predetermined pipeline stage that requires data, and perform pre-processing of the predetermined pipeline stage.

The data acquisition unit 180 determines whether data to be processed exists in the storage region of the intermediate queue (FIFO) 140. If the intermediate queue (FIFO) 140 is empty, it means that a cache determination result to be processed does not exist, and the data acquisition unit 180 waits until data is stored in the storage region. The data acquisition unit 180 acquires the "line number and cache miss flag", which is a determination result of the cache determination, from the intermediate queue (FIFO) 140. Then, the data acquisition unit 180 acquires the next cache data according to whether the cache miss flag is enabled/disabled.

Figure 4A:
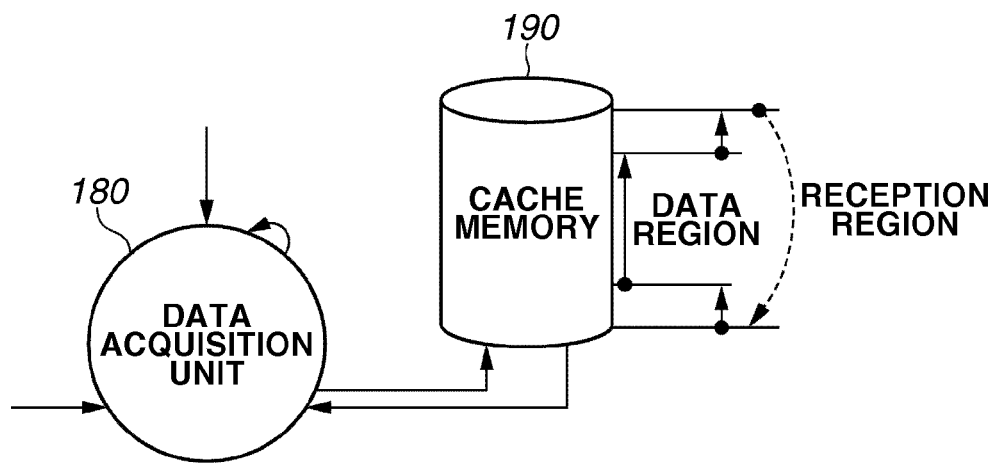
FIG. 4A illustrates a configuration of a cache memory.

FIG. 3A illustrates an example of a cache data acquisition operation of the data acquisition unit 180. As illustrated in FIG. 4A, the cache memory 190 according to the present exemplary embodiment includes a "data region (transmission region, cache region)" and a "reception region". Further, a reception pointer and a data pointer are included in the data acquisition unit 180. The reception pointer manages information of the reception region and the data pointer manages information of the data region.

In step S305, the data acquisition unit 180 acquires the "line number and cache miss flag" from the intermediate queue (FIFO) 140. In step S320, the data acquisition unit 180 determines whether the cache miss flag is enabled. If the cache miss flag is disabled (cache hit) (NO in step S320), the processing proceeds to step S360. In step S360, the data acquisition unit 180 calculates the storage address of the cache data based on the line number which has been acquired from the intermediate queue (FIFO) 140 and the reception pointer and the data pointer of the cache memory 190. Then, the data acquisition unit 180 acquires the stored data as read data 192 from the cache memory 190 according to the acquired address. In step S365, the data acquisition unit 180 transfers the cache data 185, which has been requested, to the data processing device 101 via the I/F 116. The calculation method of the storage address will be described below.

On the other hand, in step S320, if the cache miss flag is enabled (cache miss) (YES in step S320), the processing proceeds to step S340. In step S340, the data acquisition unit 180 determines whether there is a difference between the reception pointer and the data pointer. If there is no difference between the pointers (value is 0) (NO in step S340), the data acquisition unit 180 determines that the requested refill data from the DRAM 165 has not yet reached the cache memory 190, and the processing proceeds to step S345. In step S345, the data acquisition unit 180 waits until the refill data is transferred from DRAM 165.

If there is a difference between the pointers (value is not 0) (YES in step S340), the processing proceeds to step S350. In step S350, since the requested refill data transmitted from the DRAM 165 is already stored in the cache memory 190, the data acquisition unit 180 updates the data pointer. Procedures after step S350 are similar to the processing performed when the cache miss flag has been determined as disabled in step S320.

Figure 3B:
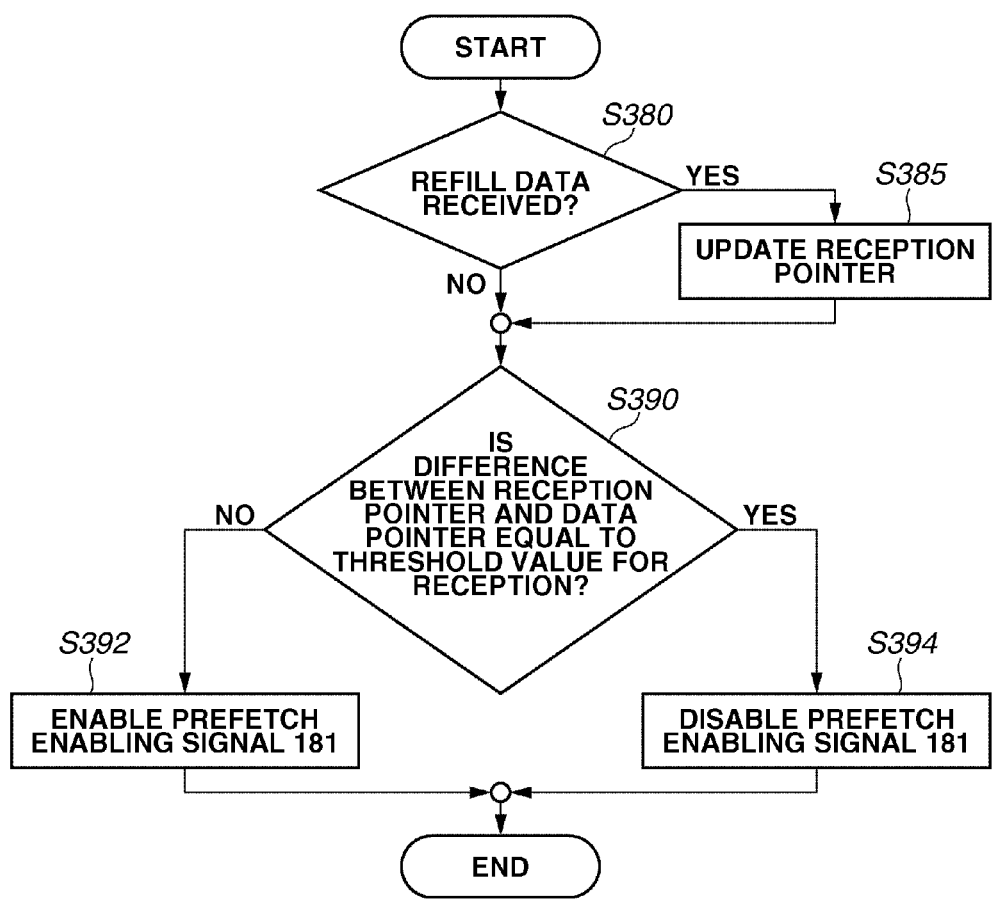
FIG. 3B is a flowchart illustrating an example of processing performed by the data acquisition unit.

In parallel with the acquisition operation of the above-described cache data, the data acquisition unit 180 receives the requested refill data. FIG. 3B illustrates an example of the receiving operation for the refill data by the data acquisition unit 180.

In step S380, the data acquisition unit 180 determines whether it has received the requested refill data from the DRAM 165. If the refill data has been received (YES in step S380), the processing proceeds to step S385. In step S385, the data acquisition unit 180 updates the reception pointer. In step S390, the data acquisition unit 180 determines whether the difference between the reception pointer and the data pointer is equal to a predetermined reception threshold value.

If the difference between the pointers is equal to the predetermined reception threshold value (YES in step S390), the data acquisition unit 180 determines that the data acquisition unit 180 is unable to receive the refill data any more, and the processing proceeds to step S394. In step S394, the data acquisition unit 180 changes the prefetch enabling signal 181 to "disabled", and then the processing ends. In step S390, if the difference between the pointers is smaller than the predetermined reception threshold value (NO in step S390), the processing proceeds to step S392. In step S392, since the refill data sent from the DRAM 165 can be received, the data acquisition unit 180 does not change the prefetch enabling signal 181 and the prefetch enabling signal 181 remains "enabled".

According to the circuit configuration, the access arbitration unit 130 is in the preceding stage of the data acquisition unit 180. Thus, even if the access arbitration unit 130 stops the access to the DRAM for data (data request) after receiving the prefetch enabling signal 181 from the data acquisition unit 180, it may be too late. Considering the difference in latency due to such a positional relation of the units in the circuit, the reception threshold value can be set in advance to a value smaller than the number of stages which can be received.

Further, as a strict method, a refill wait number can be newly defined. Then, the prefetch enabling signal 181 can be generated according to the refill wait number. The newly-defined refill wait number starts with "0" and may be incremented by one by the access arbitration unit 130 each time a cache miss occurs and decremented by one each time refill data is transferred to the data acquisition unit 180.

In other words, the refill wait number expresses the number of pieces of refill data which has not yet reached the fetch configuration when a data request has been submitted. A total of the number of pieces of received refill data (difference between the reception pointer and the data pointer) and the refill wait number is the number of pieces of refill data to be received in future. If the number of pieces of refill data to be received in future is smaller than the reception threshold value, the prefetch enabling signal 181 is "enabled". If the number of pieces of refill data to be received in future is equal to the reception threshold value, the prefetch enabling signal 181 is "disabled".

Figure 4D:
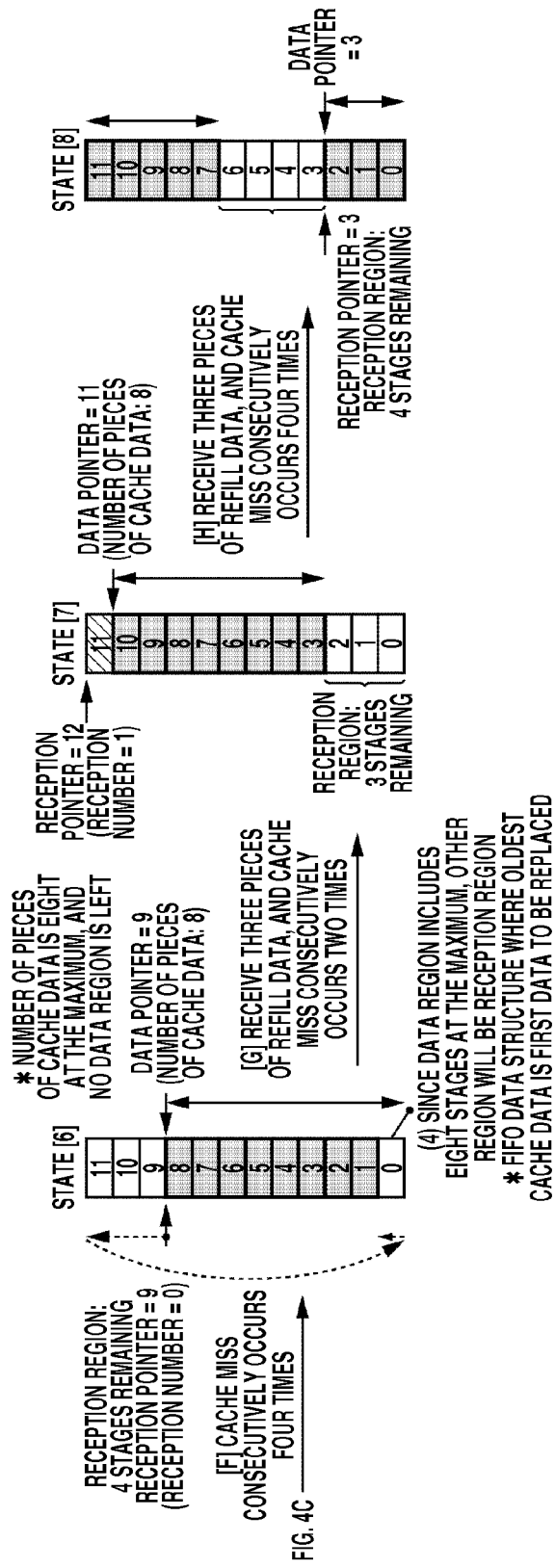

An example of the operations performed by the data acquisition unit 180 and the cache memory 190 will be described with reference to FIGS. 4B, 4C, and 4D.

First, state [0] is an initial state of the cache memory 190 just after the reset processing. When the cache memory 190 is in the initial state, the reception pointer indicates "0". Further, the data pointer, which indicates the top end of the data region, indicates "0". According to the example in FIGS. 4B, 4C, and 4D, the reception region includes 4 stages and the data region includes 8 stages.

The cache memory 190 is a storage region which includes a total of 12 stages. Each of numbers "0" to "11" is assigned to each stage from the bottom of the storage region of the illustration to the top. Each number indicates the address of the cache memory 190. Further, one stage of the storage region is a storage region which can store refill data (refill length) corresponding to one DRAM access (data request). In other words, one stage corresponds to one cache line.

If the access arbitration unit 130 receives one refill request due to one miss hit, and if the requested refill data reaches the data acquisition unit 180 ([A] receive one piece of refill data), the state of the cache memory 190 is changed to state [1].

In state [1], according to the operation procedure illustrated in FIG. 3B, one piece of refill data is stored in the cache memory 190. Then, the reception pointer is increased to "1". Since the data pointer remains at "0", the difference between the reception pointer and the data pointer will be "1". This difference indicates the reception number (number of receptions). Since the number of stages in the reception region is 4, the reception region will be the remaining three stages.

Next, one cache miss occurs ([B] one cache miss occurs) and data of the cache miss is input in the data acquisition unit 180 via the intermediate queue (FIFO) 140. Then, the state of the cache memory 190 is changed to state [2].

In state [2], according to the operation procedures illustrated in FIG. 3A, one piece of cache data is enabled. Thus, the data pointer indicates "1". The data pointer indicates the upper limit of the data region, and the position the data pointer indicates is virtually determined as a line number "8" of the data region. Regarding the state [2] where the data pointer indicates "1", the enabled cache data is in the region of address "0" of the cache memory 190.

While "1" indicated by the data pointer corresponds to the line number "8", the region of the address "0" corresponds to a line number "7" (=8-1). This corresponds to the operation described above regarding the "cache determination unit" where the line number is "7" when the result of the determination is a cache miss. Then, a portion of the reception region that received the above-described refill data is replaced by a data region.

As is the case with the ring FIFO, it is considered that the address next to "11" of the cache memory 190 is "0". Since the address "0" corresponds to the line number "7", the region of the address "11" corresponds to the line number "6". Further, the region of the address "10" corresponds to the line number "5". The same rule is applied to other addresses and the region of the address "5" corresponds to the line number "0". The data region is from the addresses "5" to "11" and "0".

The remaining addresses "1" to "4" correspond to the reception region. In state [2], since the value of the data pointer is equal to the value of the reception pointer, the received refill data is changed to stored cache data. Thus, one stage of the reception region is recovered. In other words, a portion of the reception region is replaced by a data region, and the assignment of the reception region of the cache memory is updated.

Further, when four consecutive miss hits occur, the access arbitration unit 130 submits four refill requests. Then, when four pieces of refill data are received by the data acquisition unit 180 ([C] receive four pieces of refill data), the state of the cache memory 190 is changed to state [3].

In state [3], four pieces of refill data are stored in the cache memory 190. Then, the reception pointer indicates "5". Since the value of the data pointer is unchanged ("1"), the difference between the reception pointer and the data pointer will be "4".

This difference indicates the reception number. Since the reception region includes 4 stages, there is no available stage in the reception region. In order to simplify the description, the reception threshold value described above is set to "4", which is the same as the number of stages in the reception region. Since the reception number is equal to the reception threshold value, refill data cannot be received any more. Thus, the data acquisition unit 180 changes the prefetch enabling signal 181 to "disabled" and transfers the signal to the access arbitration unit 130. Accordingly, the non-blocking access is temporarily stopped. The prefetch configuration stalls the data request to the storage device.

Further, a cache miss consecutively occurs four times ([D] cache miss occurs consecutively occurs four times) and the data is consecutively input in the data acquisition unit 180. Thus, the state of the cache memory 190 is changed to state [4].

In state [4], four pieces of cache data are enabled. Then, the data pointer indicates "5" and the available data region will be the remaining three stages.

Then, four pieces of refill data are received ([E] receive four pieces of refill data) and the state is changed to state [5]. Further, a cache miss consecutively occurs four times ([F] cache miss consecutively occurs four times), and the state is changed to state [6].

In state [6], both the reception pointer and the data pointer indicate "9". The data region is the addresses "1" to "8" and the reception region is the addresses "9" to "11" and "0". While the state is changed from state [5] to state [6], the remaining data region is reduced to 0 stage. From this point forward, some effective cache data is stored in all the 8 stages of the data region.

Further, in state [6], the cache data stored at the address "0" in state [2] exists in the reception region outside of the data region. This cache data is the oldest and is discarded from the data region during the processing in state [5] to state [6]. Since the cache data is replaced in order from the old cache data, it matches the replacement method of the FIFO (round robin). In this manner, a portion of the reception region is replaced by a portion of the data region, and a portion of the data region is replaced by a portion of the reception region. As a result, the assignment of the reception region is updated.

According to operations similar to those described above, the state of the cache memory 190 is changed to state [7] and further to state [8] according to operations [G] and [H].

Although the non-blocking operation is stalled in state [3] in FIG. 4C since the reception number has reached the reception threshold value, effective cache data is not stored in the data region from state [0] (initial state) to state [3]. In other words, from state [0] (initial state) until all the data region is filled with cache data, the reception threshold value can be set to 12 stages instead of 4 stages. In this manner, the reception region in the initial state is increased.

According to the above-described configuration, the non-blocking operation that may occur at the early phase can be prevented and the performance can be furthermore improved. Such improvement is enabled since the reception region and the data region are integrated.

The above-described "data acquisition unit" has a fetch configuration (device/circuit/logic) for acquiring the requested data. The acquired data is supplied to the predetermined pipeline stage.

With the cache device according to the present exemplary embodiment, a fully associative cache device capable of performing a non-blocking operation can be realized by a simple configuration. Further, although the conventional technique requires a fill FIFO for reception in addition to a cache memory for the non-blocking operation, according to the method of the present exemplary embodiment, a fill FIFO is not necessary since a portion of the cache memory region is assigned to the reception region.

Generally, if a storage region is realized by a built-in SRAM, the circuit size is increased when a storage region of the same capacity is configured by a plurality of built-in SRAMs rather than one built-in SRAM. According to the method of the present exemplary embodiment, since the operation of the fill FIFO of the conventional technique and the cache memory are realized by one built-in SRAM, the circuit size of the cache device can be reduced.

Further, according to the conventional technique, when a cache miss occurs, the refill data is temporarily written in the fill FIFO, readout from the fill FIFO, and written again in the cache memory to be used as cache data. In other words, according to the conventional technique, two times of writing and one time of reading are at least executed with respect to the fill FIFO and the cache memory before the data can be used as cache data.

According to the method of the present exemplary embodiment, since the data reception region and the data storage region are integrated in one storage region, when a cache miss occurs, only one time of writing and one time of reading are executed with respect to the storage region. If the method of the present exemplary embodiment is realized by hardware, a control circuit of a built-in SRAM can also be simplified. Further, if the method of the present exemplary embodiment is realized by software, since the number of access times to the storage region can be reduced, high-speed processing can be realized.

The aim of the present exemplary embodiment is to integrate the reception region in the cache memory and to reduce the number of access times with respect to the cache memory. Thus, it is not necessary to relate the cache memory and the reception region by using a reception pointer and a data pointer. For example, if a correspondence table (link table) including a relation between the cache memory and the reception region is prepared, the correspondence table (link table) can be updated according to information of a prefetch unit. In this manner, the number of access times with respect to the cache memory can be reduced.

Further, the present exemplary embodiment can also be applied to a fully associative cache device employing the FIFO principle (round robin).

Next, a case where the data supply method of the present exemplary embodiment is applied to a cache device employing a content-addressable (line selection) memory, different from the fully associative cache, such as the direct mapped cache or the set associative cache will be described.

Since the configuration described above uses the fully associative cache of the content-addressable (line selection) memory, generally, the cache tag is configured by a register. Thus, if a great number of cache tags are used in a circuit, the circuit size is increased. The advantages of the direct mapped cache and the set associative cache are that they can reduce the circuit size by using a storage device (tag memory), such as an SRAM, for the cache tag. The cache tag using a register can also be used for a direct mapped cache and a set associative cache.

Next, a "cache determination unit" and a "data acquisition unit" of the direct mapped cache and the set associative cache will be described with reference to FIGS. 5A and 5B. The difference from the configuration illustrated in FIG. 2 is mainly described, and descriptions of the components similar to those described with reference to FIG. 2 are not repeated.

First, an example of a circuit configuration of the cache determination unit 120 in the processing apparatus illustrated in FIG. 1 will be described in detail with reference to FIG. 5A.

First, the above-described storage address 113 is input into the cache determination unit 120. The cache determination unit 120 includes a number N of cache tags 530 in a tag memory (SRAM). Thus, the cache determination unit 120 is an N-line direct mapped cache. Further, numbers [0] to [N−1] are assigned in advance to the number N of cache tags 530. Each number corresponds to the corresponding cache line number of the cache memory.

The cache determination unit 120 extracts a signal that corresponds to the above-described cache tag [0] to [N−1] from the storage address 113 and sets the signal as a lower address 515. Then, the cache determination unit 120 extracts a signal that expresses the rest of the values and sets the signal as an upper address 512. Next, by using the lower address 515, the cache determination unit 120 extracts a corresponding cache tag [k] 535 from the cache tags 530. Then, the cache determination unit 120 uses a comparator 520 to determine whether the upper address 512 matches the cache tag [k] 535. The result of the determination (one comparison result 528) is output from the comparator 520 to a determinator 550.

If the comparison result 528 is "matched", then it is determined as a cache hit. If the comparison result 528 is not "matched", it is determined as a cache miss. The result of the determination is output from the cache determination unit 120 as the cache miss flag 240.

Further, if the evaluation result is a cache miss (YES in determination 555), the storage address 113 is written in the cache tag 530, and the cache tag is updated. If a direct mapped cache is used, since only one cache tag exists, it is not necessary to consider the replacement method. Regardless of whether the evaluation result is a cache hit or a cache miss, the value of the lower address 515 is output from the cache determination unit 120 as the line number 245.

As is apparent from the description above, a cache determination configuration (device/circuit/logic) of a general direct mapped cache can be used for the cache determination unit 120.

Similarly, an example of a circuit configuration of the cache determination unit 120 in the processing apparatus illustrated in FIG. 1 will be described in detail with reference to FIG. 5B. FIG. 5B illustrates an example of a 4-way set associative cache. Since many operations are similar to those of the cache determination unit of the above-described direct mapped cache, only different points will be described.

Figure 5A:
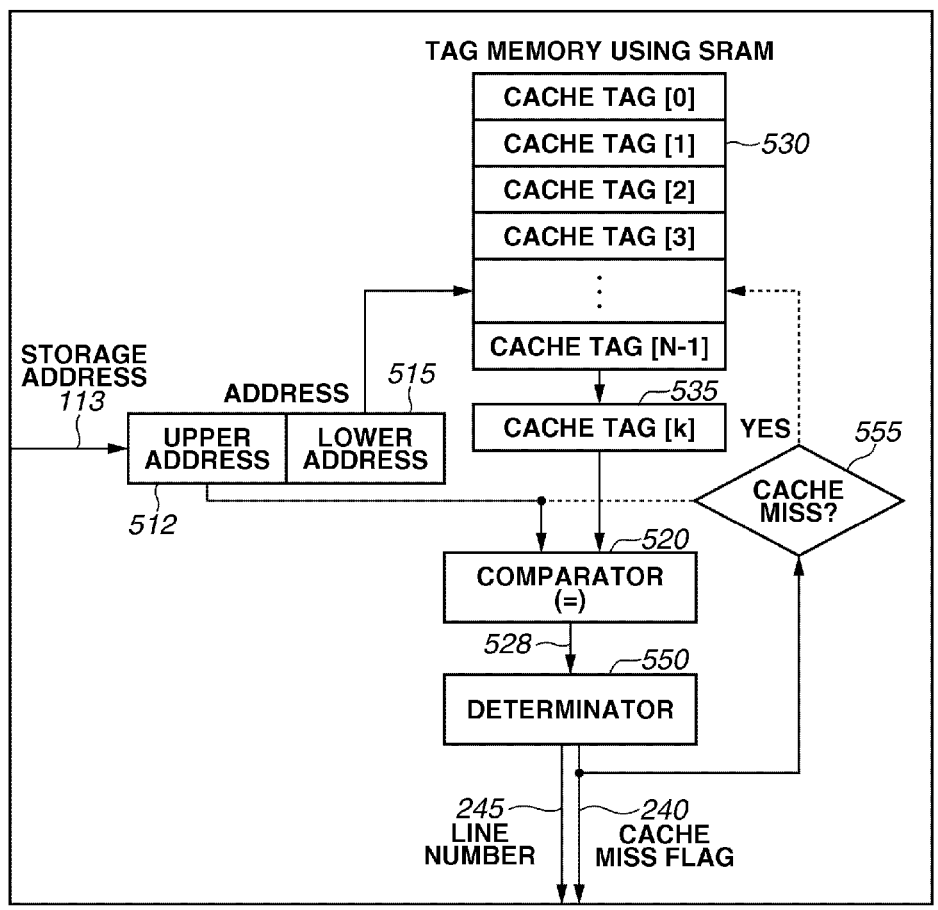
FIG. 5A is a block diagram illustrating an example of the cache determination unit.
Figure 5B:
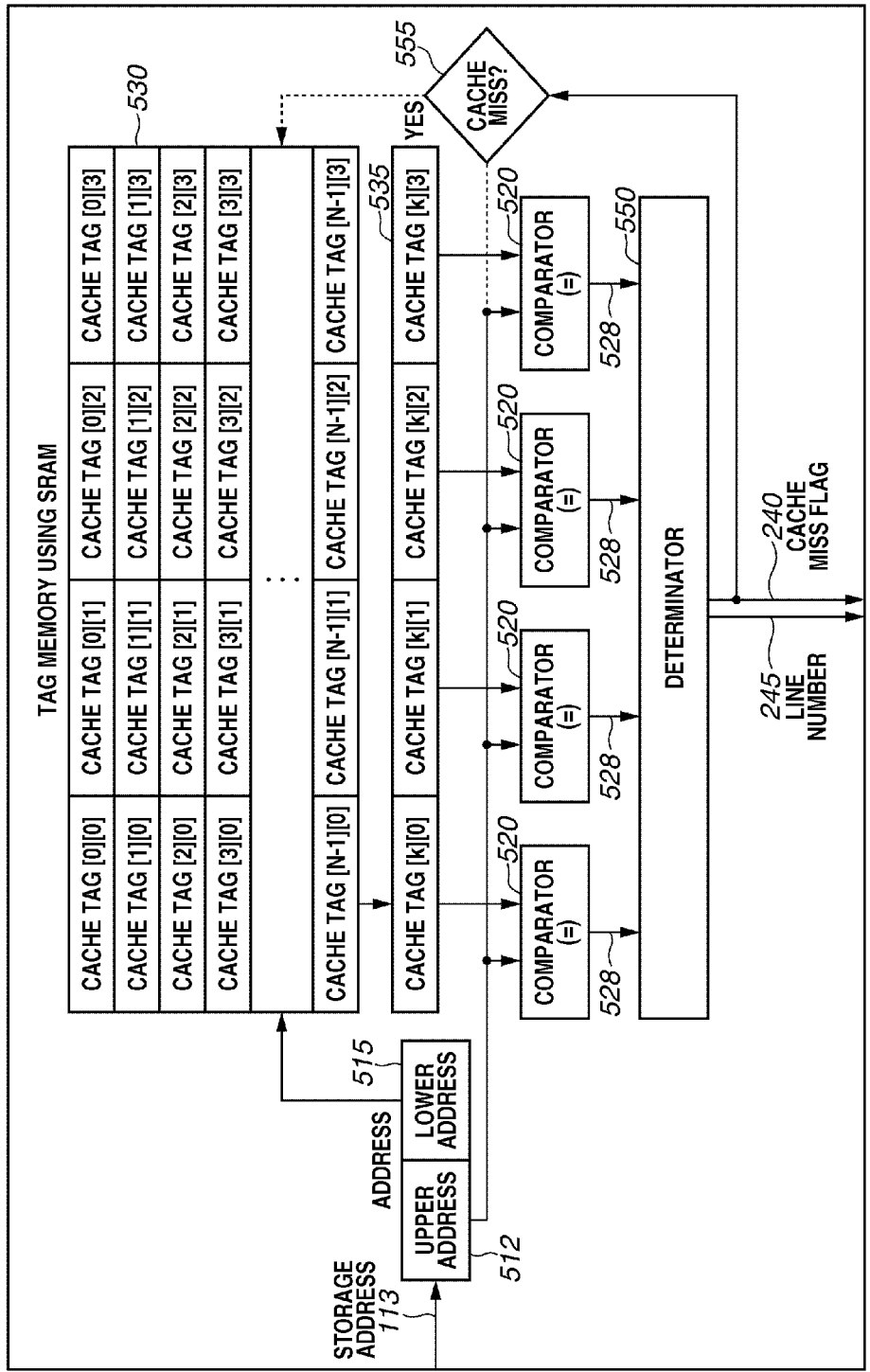
FIG. 5B is a block diagram illustrating an example of the cache determination unit.

The cache determination unit 120 illustrated in FIG. 5B includes a number 4×N of the cache tags 530 in a tag memory (SRAM). Thus, the cache determination unit 120 is a cache device of an N-line 4-way set associative cache. Further, each of numbers [0] [*] to [N−1] [*] is assigned in advance to each of a number N of cache tags 530. The number indicates the cache line number of the corresponding cache memory. Further, [*] is a way number. Since the cache device illustrated in FIG. 5B is a 4-way cache, one of values [0] to [3] is input in [*].

Next, the cache determination unit 120 extracts four corresponding cache tags (cache tags [k] [0] to [k][3]) 535 from the cache tags 530 using the lower address 515. Then, the cache determination unit 120 uses the four comparators 520 to determine whether the upper address 512 matches each of the four cache tags [k] [0] to [k] [3] 535. Then, one comparison result 528 is output from each of the four comparators 520 to the determinator 550. If any of the four comparison results 528 is "matched", it is determined as a cache hit. Further, if none of the four comparison results 528 is "matched", it is determined as a cache miss. The determination result is output from the cache determination unit 120 as the cache miss flag 240.

Further, if the determination result is a cache miss (YES in determination 555), the oldest way number is selected according to the replacement method of the FIFO principle (round robin). The cache tags of that way number are replaced by the storage address 113 while other cache tags of other way numbers remain unchanged. Then, the cache tags 530 are updated.

As is apparent from the descriptions above, a cache determination configuration (device/circuit/logic) of a general set associative cache can be used for the cache determination unit 120.

Figure 6:
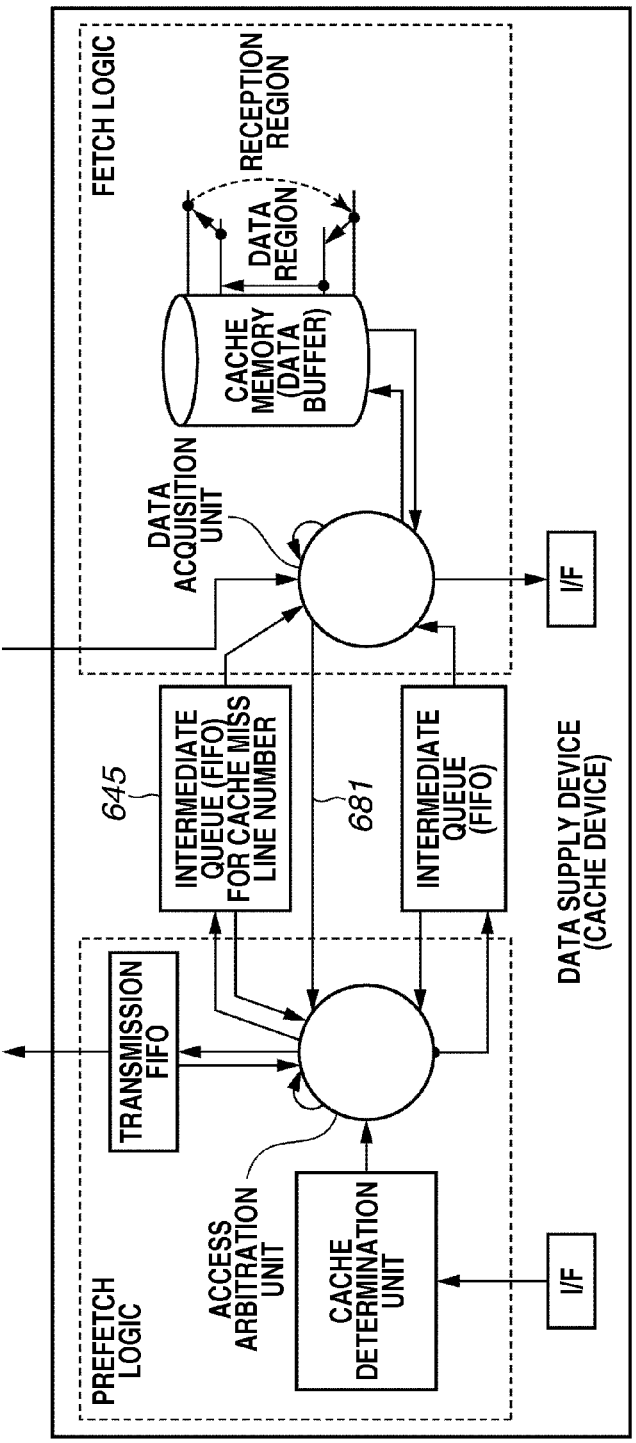
FIG. 6 is a block diagram illustrating an example of a data supply device.

Next, a data supply device (cache device) having a configuration different from the data supply device illustrated in FIG. 1 will be described with reference to FIG. 6. According to the configuration illustrated in FIG. 6, if a cache miss occurs and data is requested from the storage device, the line number when the cache miss occurred is stored in an "intermediate queue (FIFO) 645 for line number". Then, the data acquisition unit 180 acquires a line number that indicates a storage location of refill data in the cache memory when a cache miss occurs from the intermediate queue (FIFO) 645. If a space is not available in the intermediate queue (FIFO) 645, naturally, the access arbitration unit 130 is stalled.

An example of the cache memory 190 of two content-addressable (line selection) memory types will be described with reference to FIGS. 7A and 7B. FIG. 7A illustrates an example where the cache memory 190 is a direct mapped cache. FIG. 7B illustrates an example where the cache memory 190 is a 4-way set associative cache. The storage regions in FIGS. 7A and 7B have the same capacity.

In FIGS. 7A and 7B, eight storage locations are assigned in advance with respect to one cache line. According to the direct mapped cache, seven reception regions and one data region are assigned to one cache line. According to the 4-way set associative cache, four reception regions and four data regions are assigned to one cache line. Each cache memory has a plurality of storage locations for one cache line and the plurality of storage locations can be divided into a reception region and a data region according to a register setting set to the data acquisition unit 180 from an external device.

First, storage locations of the data region are assigned according to the number of cache tags which are addressable for one address. In other words, one storage location is set for a data region regarding the direct mapped cache and four storage locations are set for a data region regarding the 4-way set associative cache. Then, the remaining storage locations are set as the reception region. In this manner, by changing the distribution of the storage locations in the reception region and the data region, a cache memory of the same capacity can be used for different distribution types of content-addressable (line selection) memories. Even if the cache determination unit 120 is changed to a determination circuit using a different type of content-addressable (line selection) memory, the data acquisition unit 180 and the cache memory 190 can be used without making any changes.

Although the data region is assigned from the storage region according to the type of content-addressable (line selection) memory, at least one storage location is used as the reception region with respect to the remaining storage region. It is not always necessary to assign all the remaining storage regions to the reception region. For example, by changing the way in which the reception pointer and the data pointer are calculated, the remaining storage location can be used for a different purpose.

Figure 8A:
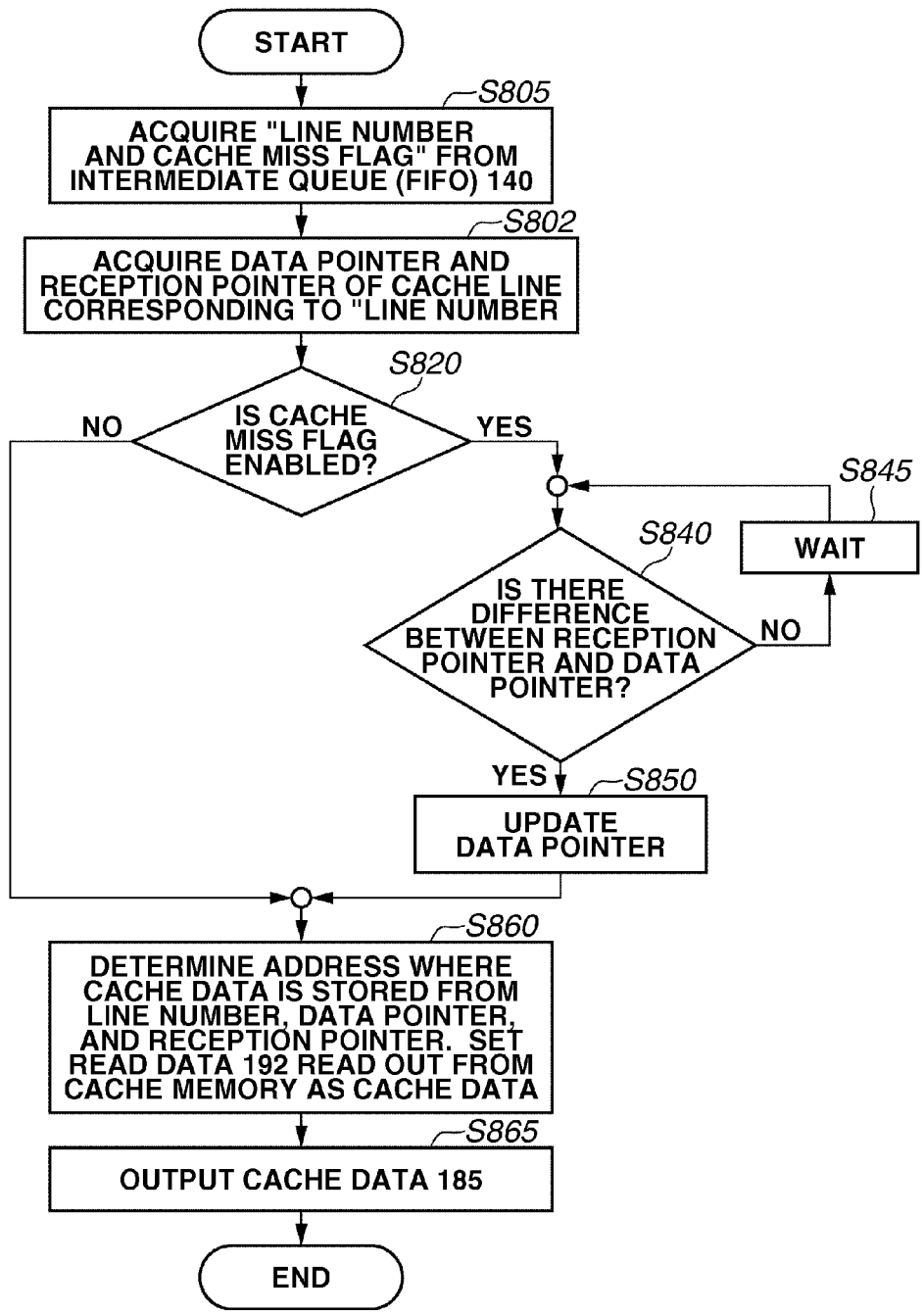
FIG. 8A is a flowchart illustrating an example of processing performed by the data acquisition unit.
Figure 8B:
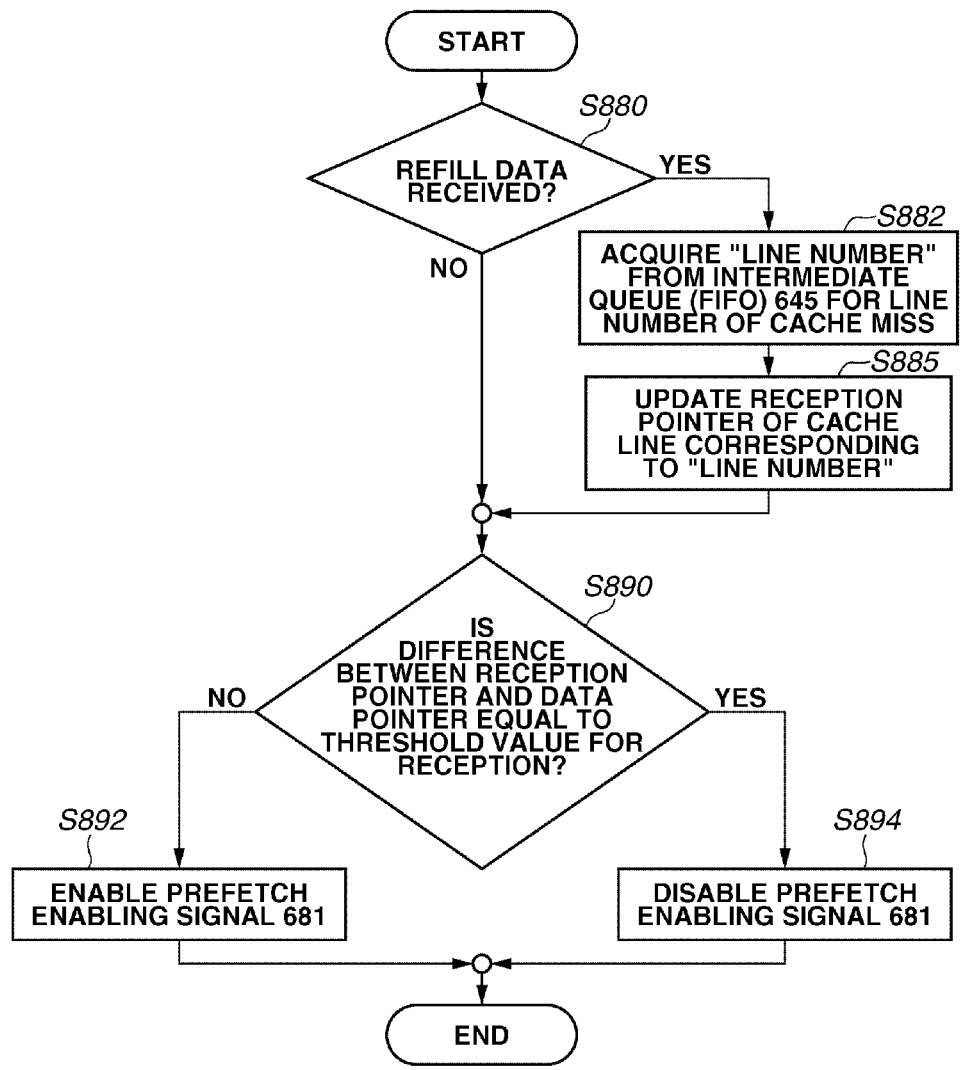
FIG. 8B is a flowchart illustrating an example of processing performed by the data acquisition unit.

FIG. 8A illustrates an example of an acquisition operation for the cache data performed by the data acquisition unit 180. FIG. 8B illustrates an example of a receiving operation for the refill data. The data acquisition unit 180 illustrated in FIGS. 7A and 7B includes a reception pointer and a data pointer for each cache line. When the data acquisition unit 180 performs the data acquisition operation and the refill data reception operation, the data acquisition unit 180 needs to select a corresponding reception pointer and data pointer from the related line number.

Regarding the data acquisition operation in FIG. 8A, in step S805, the data acquisition unit 180 acquires from the intermediate queue (FIFO) 140 a "line number and cache miss flag" as a cache determination result to be processed. In step S802, the data acquisition unit 180 acquires a reception pointer and a data pointer corresponding to the line number.

Regarding the refill data reception operation in FIG. 8B, in step S882, the data acquisition unit 180 acquires a related line number from the intermediate queue (FIFO) 645 for line number of a cache miss. In step S885, based on the acquired line number, the data acquisition unit 180 acquires and updates the corresponding reception pointer.

The data acquisition operation and the refill data reception operation after the corresponding reception pointer and data pointer are acquired are similar to the operations described above with reference to FIGS. 3A and 3B.

Operations and the relation between the reception pointer and the data pointer after the line number is acquired by the above-described method and the storage region in the cache memory is determined by the line number are similar to those described above with reference to FIGS. 3A and 3B.

A prefetch enabling signal 681 sent from the data acquisition unit 180 to the access arbitration unit 130 is a set of one-bit enabling signals for all the cache lines, each of which is calculated based on the reception pointer and the data pointer corresponding to each cache line. This point is different from the above-described configuration.

The content-addressable (line selection) memory of the set associative cache employs a replacement method of the FIFO principle (round robin) as is with the above-described configuration. However, since the content addressable number of the content-addressable (line selection) memory of the direct mapped cache is one, it is not called a FIFO (round robin) replacement method. The content-addressable (line selection) memory of the direct mapped cache is different from other types of content-addressable (line selection) memory in this point.

The above-described "data acquisition unit" has a fetch configuration (device/circuit/logic) used for acquiring the requested data according to the content-addressable (line selection) memory type, such as the direct mapped cache or the set associative cache.

According to the data supply device (cache device) illustrated in FIGS. 5A and 5B, a cache device capable of performing a non-blocking operation using a direct mapped cache or a set associative cache can be realized by a simple configuration. Further, although a fill FIFO for reception for the non-blocking operation is executed in addition to a cache memory according to the conventional technique, only a portion of a region of the cache memory needs to be assigned to the reception region according to the method of the present exemplary embodiment, and there is no need to prepare a fill FIFO.

Further, according to the content addressable number, the direct mapped cache in the prefetch configuration of the cache determination circuit can be replaced with the set associative cache in the prefetch configuration, and vice versa. If the cache determination circuit is changed, regarding the data acquisition unit and the cache memory in the fetch configuration, the areas of the reception region and the data region in the storage region are changed. According to the present exemplary embodiment, a data supply device (cache device) which can correspond to various content addressable numbers can be realized while reducing design man-hours.

In the examples described above, the data supply method of the present exemplary embodiment is applied to a cache device. However, it is apparent that the data supply method can be applied to a device other than the cache device. Although the cache determination unit 120 determines a cache hit/miss according to the input storage address and the cache device acquires corresponding cache data from the cache memory, the data processing device 101 can directly request the access arbitration unit 130 for the data of the storage address without involving the cache determination unit 120 (without including the cache determination unit 120).

At this time, the data processing device 101 repeatedly submits a request for update data to the storage device (corresponding to a cache miss) and a request for refilled data from the storage device (corresponding to a cache hit) in a pattern determined in advance, for example, by a sequencer circuit or the like. While the data acquisition unit 180 receives the refill data according to the pre-determined pattern, it also updates the data in the data buffer (corresponding to cache memory). Thus, the data acquisition unit 180 continuously supplies the requested data in the storage device to the data processing device 101 while updating that data.

According to the above-described data supply device, a non-blocking operation regarding the data acquisition and the data update in the data buffer can be realized by a very simple configuration. Further, although a fill FIFO for reception is used in addition to a cache memory for the non-blocking operation according to the conventional technique, the method of the present exemplary embodiment does not require a fill FIFO since a portion of a region of the data buffer is assigned to the reception region.

Figure 9:
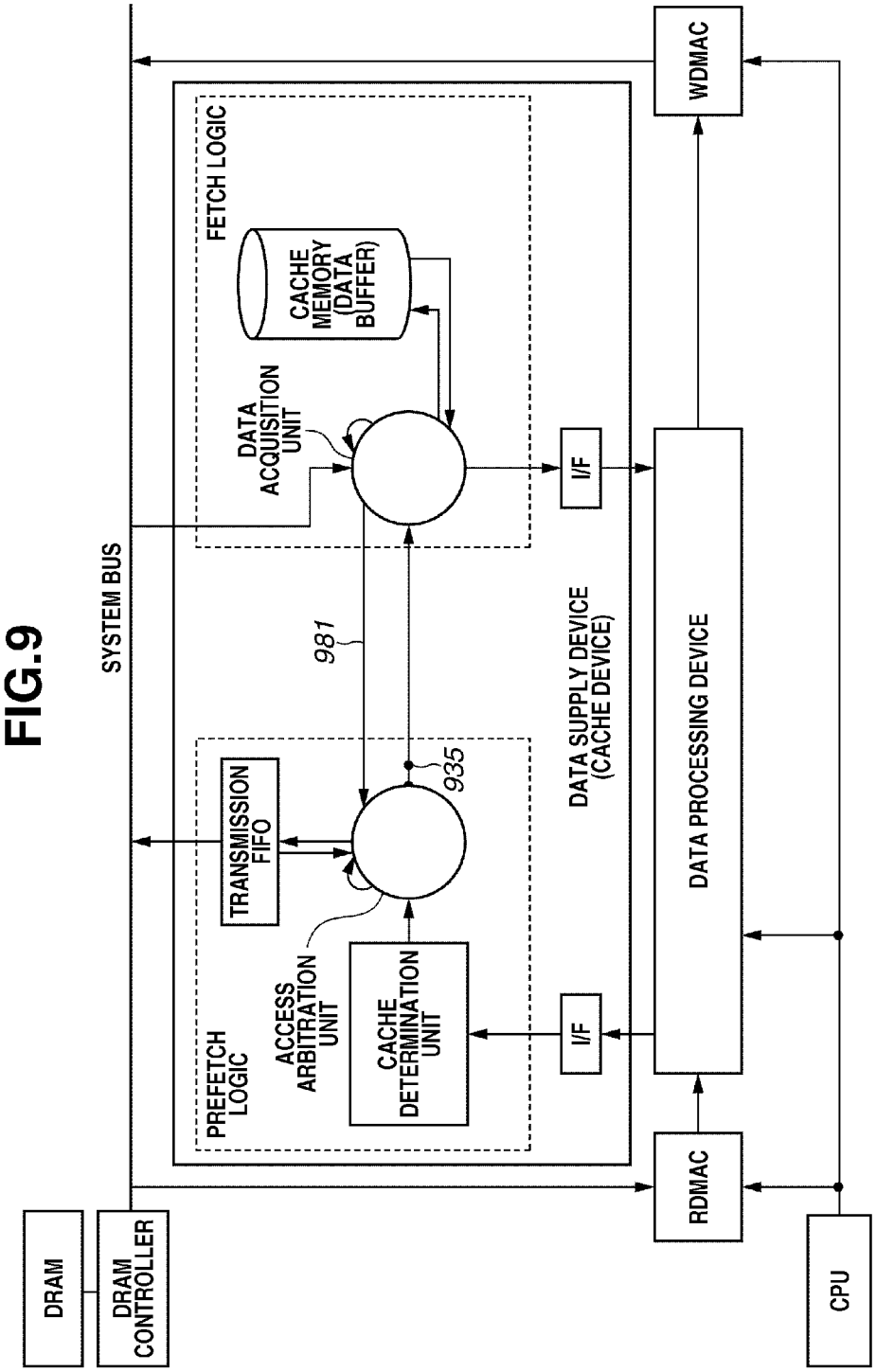
FIG. 9 is a flowchart illustrating an example of a processing apparatus performing a blocking operation.

Further, according to the descriptions above, a device that can improve performance according to a non-blocking operation has been described. However, it is apparent that the processing apparatus according to the present exemplary embodiment is applicable to a blocking operation without involving an intermediate queue (FIFO). For example, an example of a processing apparatus that does not include an intermediate queue (FIFO) is illustrated in FIG. 9. An access arbitration unit directly transfers a "line number and cache miss flag" 935 to a data acquisition unit. Then, a prefetch enabling signal 981 is transmitted from the data acquisition unit to the access arbitration unit. The blocking operation is realized in this manner.

If the cache miss flag is "enabled", until the requested data is refilled in the reception region, the prefetch enabling signal 981 is changed to "disabled" so that the prefetch operation of the access arbitration unit is stopped. On the other hand, if the cache miss flag is "disabled", the prefetch enabling signal 981 remains unchanged as "enabled", and the prefetch operation of the access arbitration unit is continued.

Since the difference between the reception pointer and the data pointer remains at "0" until the requested data is refilled, the data acquisition unit stays at "wait" according to the processing flow described with reference to FIGS. 3A and 3B. Thus, the processing apparatus can deal with the blocking operation described above without contradiction. Regarding the blocking operation, the processing apparatus can deal with the blocking operation even if the reception region is 0 stage. In order to meet the aim of the present exemplary embodiment, however, the procedure of receiving the refill data at one stage of the reception region and storing the data as cache data is maintained. Thus, the data acquisition unit does not need to be modified according to the operation.

Further, according to the descriptions above, the information used for managing the reception region (reception pointer) and the information used for managing the data region (data pointer), being the features of the present exemplary embodiment, are included in the data acquisition unit. Thus, a general cache determination configuration (device/circuit/logic) can be used for the cache determination unit. However, such management information can also be stored in the cache determination unit along with the cache tags. Then, the calculation of the storage location address of the cache data and the calculation of the difference between the reception pointer and the data pointer, which are performed by the data acquisition unit, can be performed in advance by the cache determination unit. Then, the calculation results can be transmitted to the data acquisition unit via the intermediate queue (FIFO).

In particular, regarding the configuration in FIGS. 5A and 5B, the management information needs to be stored for each cache line. By storing the management information along with the cache tags in the tag memory of the cache determination unit, the integration of the cache tags and the management information in the storage configuration can be realized.

Further, according to the descriptions above, the information used for managing the reception region (reception pointer) and the information used for managing the data region (data pointer) are used for describing the operation. However, the management is not necessarily performed only by the pointers that indicate the storage location in the storage region. For example, it can be managed by a reception pointer and a reception number that indicate the state of the reception region.

According to this management, the data pointer can be considered as a value obtained by subtracting a reception number from the reception pointer. Then, each time refill data is received, the reception number is incremented by one, and the reception pointer is updated. Further, according to the information (cache miss flag) output from the prefetch configuration, if the flag indicates a cache miss, the reception number is decremented by one. If the flag indicates a cache hit, the reception number is not changed.

The advantage of the above-described configuration is that the data supply device of the present exemplary embodiment can be controlled only by using the management information of the reception region. In other words, since the data supply device can be controlled only by the management information of the reception region and a reception region used in the reception of data is assigned to the storage region for storing data, the above-described configuration matches the aim of the present exemplary embodiment.

Further, processing in the above-described exemplary embodiment can be realized by a plurality piece of hardware and software. In this case, a software program acquired via a network or various storage media is executed by a processing device (CPU, processor) of a computer or the like. Further, the present exemplary embodiment can also be realized by supplying a storage medium storing a program, which causes a computer to realize the function of the above-described embodiment, to a system or an apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-111585 filed May 18, 2011, which is hereby incorporated by reference in its entirety.

What is claimed is:

1. A data supply device comprising:
an output unit;
a fetch unit including a storage region of a cache memory for storing data and configured to supply data stored in the storage region to the output unit, wherein the storage region comprises a reception region and a transmission region; and
a prefetch unit configured to request, from an external memory device, cache miss data to be transmitted to the output unit before the output unit requests external data and determined to be not stored in the storage region, wherein the prefetch unit is configured to request the cache miss data from the external memory device based on a prefetch enable signal output from the fetch unit and an available space of an intermediate queue between the prefetch unit and the fetch unit, the prefetch enable signal indicating whether the prefetch unit is able to store the cache miss data the fetch unit requests from the external memory device, in the reception region which is a portion of the storage region,
wherein the fetch unit is configured to store the external data received from the external memory device, in the reception region, and to assign, as a portion of the transmission region, a portion of the reception region where the external data corresponding to a request from the prefetch unit is already stored according to the request from the prefetch unit, when the output unit requests the external data, and
wherein the output unit is configured to output data stored in the portion assigned as the portion of the transmission region by the fetch unit.

2. The data supply device according to claim 1, wherein the fetch unit is configured to assign a portion of the transmission region as the reception region, to store data supplied from the external memory device in the reception region, and, according to a request from the prefetch unit, to reassign, as the transmission region, the reception region where data corresponding to the request is stored.

3. The data supply device according to claim 1, further comprising a pipeline unit including a plurality of stages,
wherein the fetch unit is configured to supply data to one of the plurality of stages; and
wherein the prefetch unit is configured to request data according to an operation of a stage preceding a stage to which the fetch unit supplies data.

4. The data supply device according to claim 1, wherein the data supply device is configured to update management information used for managing the reception region when the cache miss data requested by the prefetch unit has reached the fetch unit.

5. The data supply device according to claim 1, wherein the data supply device is configured to change a capacity of the reception region relative to the storage region.

6. The data supply device according to claim 4, wherein the data supply device is configured to output the prefetch enable signal and stop a data request from the prefetch unit based on the management information of the reception region.

7. The data supply device according to claim 4, wherein the data supply device is configured to wait for data supply from the fetch unit based on the management information of the reception region.

8. The data supply device according to claim 1, further comprising an intermediate queue located between the prefetch unit and the fetch unit.

9. A cache device comprising:
the data supply device according to claim 1; and
a cache determination unit,
wherein the cache device is configured to store refill data corresponding to the cache determination unit in the storage region of the fetch unit.

10. The cache device according to claim 9, wherein the cache device is configured to use a round robin replacement method.

11. The cache device according to claim 9, wherein a content-addressable (line selection) memory type is a fully associative cache.

12. The cache device according to claim 9, wherein a content-addressable (line selection) memory type is a set associative cache.

13. The cache device according to claim 9, wherein a content-addressable (line selection) memory type is a direct mapped cache.

14. The data supply device according to claim 1, wherein the fetch unit is configured to manage a reception pointer indicating the reception region and a data pointer indicating the transmission region, and to change the assignment of the reception region or the transmission region by updating the reception pointer or the data pointer.

15. The data supply device according to claim 1, wherein a capacity of the transmission region increases to a predetermined capacity in accordance with a reception state from the external memory device.

16. The data supply device according to claim 1, wherein the prefetch unit is configured to acquire a line number of the storage region based on a request address to the external memory device, to update management information of the reception region, and to assign, as a transmission region, the reception region where data corresponding to the request is stored.

17. The data supply device according to claim 1, wherein the prefetch unit is configured to determine whether to request or stop requesting cache miss data from the external memory device based on a prefetch enable signal from the fetch unit.

18. The data supply device according to claim 1, wherein the prefetch enable signal indicates allowance in a case where the cache miss data from the external memory device is able to be stored in the reception region, and indicates prohibition in a case where the cache miss data from the external memory device is unable to be stored in the reception region.

19. The data supply device according to claim 1, wherein data that is transmitted from the external memory device to the reception region before a notification indicating stop of a data request from the prefetch unit to the external memory device is issued using the prefetch enable signal, is stored in the reception region.

20. The data supply device according to claim 1, wherein a predetermined capacity larger than zero is reserved in the reception region.

21. A data supply method for a data supply device including an output unit, a prefetch unit configured to request, from an external memory device, cache miss data to be transmitted to the output unit before the output unit requests external data and determined to be not stored in a storage region of a cache memory, and a fetch unit including the storage region for storing data and configured to supply data stored in the storage region to the output unit, wherein the storage region comprises a reception region and a transmission region, the method comprising:

requesting at the prefetch unit, the cache miss data from the external memory device based on a prefetch enable signal output from the fetch unit and an available space of an intermediate queue between the prefetch unit and the fetch unit, the prefetch enable signal indicating whether the fetch unit is able to store the cache miss data the prefetch unit requests from the external memory device, in the reception region which is a portion of the storage region, storing the external data received from an external memory device, in the reception region;

assigning, as a portion of the transmission region, a portion of the reception region where the external data corresponding to a request from the prefetch unit, is already stored according to the request from the prefetch unit, when the output unit requests the external data; and outputting, via the output unit, data stored in the portion assigned as the portion of the transmission region.

\* \* \* \* \*